J. P. SMITH.
Corn Sheller.
No. 12,454.
Patented Feb. 27, 1855.
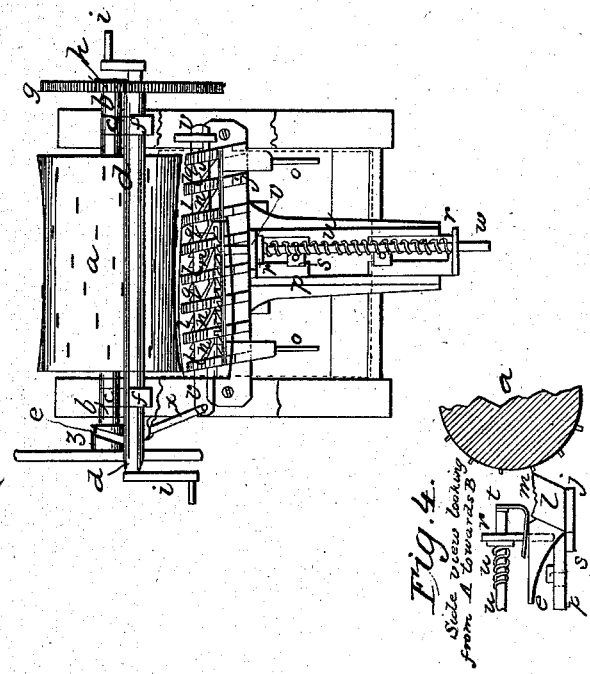

UNITED STATES PATENT OFFICE.

JEREMIAH P. SMITH, OF HUMMELSTOWN, PENNSYLVANIA.

CORN-SHELLER.

Specification of Letters Patent No. 12,454, dated February 27, 1855.

*To all whom it may concern:*

Be it known that I, JEREMIAH P. SMITH, of Hummelstown, in the county of Dauphin and State of Pennsylvania, have invented a new and useful Improvement on a Corn-Sheller; and I do hereby declare that the following is a full, clear, and exact description of the construction and operation of the same, reference being had to the annexed drawing, making a part of this specification, in which—

Figure 2 is a top view; Fig. 3, elevation; Fig. 4, side view.

The nature of my invention consists in providing the breast beam, having fluted concave ribs, cross ribs, with openings or spaces, slides, guide frame in separate pieces, ribbed shelling bar, vibrating feeder and grooved pulley.

To enable others skilled in the art to make and use my invention, I will proceed to describe its construction and operation.

I do not limit myself to any particular size of my sheller.

1st, is the cylinder $a$, which is concave and armed with spiral rows of teeth to discharge the cobs; the cylinder may be constructed either of wood or iron; the shaft $b$ runs through cylinder $a$ and rests on the bearings $c\ c$. The shaft $d$ rests on the bearings $f\ f$. The driving wheel $g$ is fastened on the shaft $d$, meshes in pinion $h$ the whole being propelled by the cranks $i\ i$ next the breast beam $j$ lying in juxtaposition with the cylinder and has spiral ribs $l,\ l$, which are concave on the top as seen in Fig. 4, letter $m$, and are fluted in the concave for the purpose of shelling the corn when made to revolve by the cylinder. The cross spiral ribs $n\ n$ are also for the same purpose. The slides $o,\ o$, are intended for the shelling bar $t$ to slide on, backward and forward, and to keep the bar in its proper place. The guide beam $p$ and the breast beam $j$, the slides $o,\ o$, the spiral ribs $l,\ l$, and the cross spiral ribs $n,\ n$, are all cast in one piece. The spacer or opening between the spiral ribs lettered $q\ q$ will leave the shelled corn drop through without breaking or cutting the grains. The guide frames $r,\ r$, are in separate pieces screwed on the guide beam $p$ by the screws $s,\ s$.

The advantage of having the guide frames in separate pieces is to move them backward and forward to suit the nature of the corn green or dry. The shelling bar $t$ is to press the ears of corn to the cylinder $a$ by means of the coiled spring $u$ which rests on the guide $w$. The ribs $y,\ y$, in the shelling bar are to let the corn through while shelling. The feeder plate $v$, derives its motion from the pulley by having a zig zag groove $e$ and fastened on shaft $b$. Said groove $e$, works the lever $x$ and connects with the feeding plate $v$, having teeth on both sides to work in the corn by its continual vibration.

This machine is equally adapted to hand or horse power. The vibrating feeder is to be so constructed that it may be detached at pleasure by those using or building the machine.

I am aware that an adjustable flat toothed bar has been used opposite to a toothed cylinder in corn shellers; I am also aware that the ribbed shelling bar has been in use. Therefore I do not claim any of the above-mentioned parts; but What I do claim is—

1. The breast beam $j$ having fluted concave ribs $l\ l$ cross ribs $n\ n$ with openings or spaces $q\ q$ and slides $o,\ o$.

2. I claim the guide frames $r,\ r$, in separate pieces for the purpose above described.

3. I claim the vibrating feeder having teeth thereon in combination with the pulley by having a zig zag groove $e$ substantially as described.

JEREMIAH P. SMITH.

Witnesses:
MICHAEL BAUM,
JESSE B. HUMMEL.